(12) United States Patent
Inoue et al.

(10) Patent No.: US 7,104,571 B2
(45) Date of Patent: Sep. 12, 2006

(54) CONNECTOR CLIP FOR VERIFYING COMPLETE CONNECTION BETWEEN A CONNECTOR AND A PIPE

(75) Inventors: Tomoki Inoue, Aichi-ken (JP); Kazuhito Kasahara, Aichi-ken (JP)

(73) Assignee: Tokai Rubber Industries, Ltd., (JP)

( * ) Notice: Subject to any disclaimer, the term of this patent is extended or adjusted under 35 U.S.C. 154(b) by 0 days.

(21) Appl. No.: 10/768,501

(22) Filed: Jan. 30, 2004

(65) Prior Publication Data
US 2004/0183296 A1 Sep. 23, 2004

(30) Foreign Application Priority Data
Jan. 31, 2003 (JP) .............. 2003-025329

(51) Int. Cl.
*F16L 35/00* (2006.01)
(52) U.S. Cl. ........................... 285/93; 285/319
(58) Field of Classification Search ................ 285/319, 285/93, 81
See application file for complete search history.

(56) References Cited

U.S. PATENT DOCUMENTS

| | | | | |
|---|---|---|---|---|
| 3,929,357 A * | 12/1975 | DeVincent et al. | ......... | 285/319 |
| 4,035,005 A * | 7/1977 | DeVincent et al. | ......... | 285/319 |
| 4,135,745 A * | 1/1979 | Dehar | ......... | 285/319 |
| 4,979,765 A * | 12/1990 | Bartholomew | ......... | 285/93 |
| 5,354,102 A * | 10/1994 | Carman | ......... | 285/81 |
| 5,395,140 A * | 3/1995 | Wiethorn | ......... | 285/93 |
| 5,779,279 A * | 7/1998 | Bartholomew | ......... | 285/93 |
| 5,931,509 A * | 8/1999 | Bartholomew | ......... | 285/93 |
| 6,601,878 B1 * | 8/2003 | Ooi et al. | ......... | 285/93 |
| 6,762,365 B1 * | 7/2004 | Inoue et al. | ......... | 174/84 R |
| 2003/0094809 A1 * | 5/2003 | Inoue | ......... | 285/93 |
| 2004/0066034 A1 * | 4/2004 | Takayanagi et al. | ......... | 285/93 |
| 2004/0183296 A1 * | 9/2004 | Inoue et al. | ......... | 285/93 |

OTHER PUBLICATIONS

Japan Abstract Publication No. 11-006591 and English Translation.

* cited by examiner

*Primary Examiner*—David Bochna
(74) *Attorney, Agent, or Firm*—Andrus, Sceales, Starke & Sawall, LLP

(57) ABSTRACT

The connector clip for verifying complete connection integrally includes a clip body of U-shape in cross-section to receive a tubular holding portion and a connection verifying portion of U-shape in cross-section to receive an opposite axial side of an annular verification projection with respect to the pipe. The connection verifying portion has a verifying body and a snap-fit portion. The clip body and the verifying body are connected via a connection part, while the verifying body and the snap-fit portion are connected via a joint part. Reinforcement ribs are formed along an entire circumference of outer surface of the verifying body.

11 Claims, 13 Drawing Sheets

CONNECTOR CLIP FOR VERIFYING COMPLETE CONNECTION BETWEEN A CONNECTOR AND A PIPE

BACKGROUND OF THE INVENTION

The present invention relates to a connector clip which is adapted to verify complete connection or fitting connection between a connector used in a joint of a piping, for example, a gasoline fuel piping of a vehicle, and a pipe inserted in the connector.

In a joint of a fluid piping, a connector having a tube connecting portion is applied to join a pipe and a tube. In such piping, for example, the pipe is provided with an annular engagement projection on an outer peripheral surface of one axial side or an inserting end portion, and the connector is configured with a retainer fitted in a pipe inserting portion or a holding portion of the connector. Then, the pipe is inserted into the retainer so as to allow the annular engagement projection to snap-engage with one axial end portion of the retainer providing a stop mechanism between the pipe and the connector with a tube connected to the tube connecting portion. Hence, if an operator does not take care sufficiently to complete connection between the pipe and the connector, the pipe might not be fully inserted into the retainer and the annular engagement projection of the pipe might not snap-engage with one axial end portion of the retainer, or the retainer might not be fitted properly in the pipe inserting portion or the holding portion of the connector. That is, the pipe might be in a half-fitting relation with respect to the connector. Meanwhile within a connecting portion between a connector and a pipe, a sealing member is disposed to prevent an internal fluid from leaking out. However, in case of a piping system subject to operation while the pipe is incompletely connected with the connector, usually sealing property by the sealing member between the connector and the pipe is insufficient or becomes lowered, and an internal fluid leaks out. In view of the foregoing aspect, it is preferred to adapt means for verifying complete connection and preventing incomplete connection between a connector and a pipe, in order not to subject a piping system to operation while the pipe is not fully inserted into the retainer, or the retainer is not properly fitted in the pipe inserting portion of the connector.

As for such means for verifying complete connection between a connector and a pipe, a connector connecting construction disclosed in the following Patent Document 1 is known. In the connector connecting construction, in addition to an annular engagement projection (first annular rib) for snap-engagement, an annular verification projection (second annular rib) is provided on an outer peripheral surface of the pipe so as to be located on an opposite axial side of or beyond an opposite axial end of the connector when the pipe is connected to the connector. Then, a connector clip for verifying complete connection between a connector and a pipe is put on and mounted to the connector and thus configured pipe. The connector clip includes a clip body (intermediate part) of U-shape in cross section having one-side wall portion (second lateral wall) and an opposite-side wall portion (first lateral wall) on opposite ends thereof. The opposite-side wall portion (first lateral wall) is provided with a connection verifying portion (protruding portion). One-side wall portion of the connector clip for verifying complete connection is provided with a fit-on recess (second cutaway recess) and the opposite-side wall portion thereof is also formed with another fit-on recess (first cutaway recess). The fit-on recess (second cutaway recess) is to be fitted on a portion of the connector on one axial side of a holding portion, and adjacent to the holding portion, while the another fit-on recess (first cutaway recess) is to be fitted on a portion of the pipe on an opposite axial side of the annular verification projection, and adjacent to the annular verification projection. And, the connection verifying portion is configured by a pair of restraining portions formed on opposite end portions or both widthwise sides of the another fit-on recess of the opposite-side wall portion. A distance between a pair of the restraining portions is designed equal to a width of an opening side (a side of a first guiding surface of the first cutaway recess) of the another fit-on recess.

If the pipe is correctly inserted in and connected to the connector and the annular verification projection is located in a fixed axial position, the connector clip for verifying complete connection is easily mounted to the connector and the pipe so as to clip or hold a held portion from the holding portion of the connector to the annular verification projection of the pipe by the one and the opposite-side wall portions from axially opposite sides thereof However, if the pipe is incompletely fitted in the connector and the annular verification projection is located relatively (relatively with respect to the connector) toward an opposite axial direction of or beyond the fixed axial position, the annular verification projection abuts the connection verifying portion, is not allowed to pass through the connection verifying portion, and therefore, the connector clip cannot be mounted to the connector and the pipe. Therefore, complete connection of the pipe to the connector can be verified by mounting the connector clip to the connector and the pipe. On the contrary, when the connector clip cannot be mounted to the connector and the pipe, incomplete connection of the pipe can be consequently verified.

Patent Document 1 JP, A, 11-6591

Meanwhile, in a connector clip for verifying complete connection between a connector and a pipe disclosed in the Patent Document 1, the connection verifying portion is constructed by a pair of thin-walled restraining portions. So, when the pipe is incompletely connected to the connector, if the annular verification projection is strongly pushed against the restraining portions, the restraining portions are possibly deformed so as to allow the annular verification projection to pass through therebetween. Such connector clip does not offer highly reliable function for verifying complete connection. In order to enhance reliability of the function for verifying complete connection, the connector clip may be formed hard. However, if the connector clip is formed hard, the connector clip might not be mounted without exerting excessive force thereto even when the pipe is completely connected to the connector. Moreover, considering factors of dimensional errors of the connector and/or the pipe, it is anticipated to be more difficult to mount the connector clip to the connector and the pipe.

Then it may be considered to construct the connection verifying portion to have a pipe receiving recess of U-shape in cross-section with width equal to or generally equal to an outer diameter of a body of the pipe. And, it is effective to form reinforcement ribs integrally on an outer surface or an outer peripheral surface of the connection verifying portion in order to increase widening resistance of the pipe receiving recess and more ensure that the annular verification projection is not fitted in the pipe receiving recess.

However, the clip body is typically constructed to clip a large diameter portion of the connector from widthwise opposite sides, or to have a connector receiving recess with width generally equal to an outer diameter of the large diameter portion of the connector. Therefore, if widening resistance is increased with respect to the pipe receiving recess of the connection verifying portion by forming reinforcement ribs thereon, the connector receiving recess of the clip body is restrained by the connection verifying portion, and thereby the widening resistance is increased also with respect to the connector receiving recess. As a result, it is also feared that favorable mounting property of the connector clip is lowered.

Accordingly, it is an object of the present invention to provide a connector clip having a highly reliable function for verifying complete connection between a connector and a pipe, and further having a favorable mounting property.

SUMMARY OF THE INVENTION

In order to achieve the aforementioned object, there is provided a novel connector clip for verifying complete connection between a connector and a pipe, namely, connector clip for preventing incomplete connection between a connector and a pipe, having excellent function for verifying complete connection and mounting property. The connector clip, for example, the connector cap for verifying complete connection between a connector and a pipe according to the present invention is applied to be put on and mounted to a connector and a pipe inserted in the connector. The connector has a tube connecting portion on one axial side thereof, and is provided with sealing member in an inner peripheral surface thereof. The pipe is provided with an annular engagement projection and an annular verification projection on an outer peripheral surface thereof. The pipe is inserted into an opening on an axial end of the connector, relatively in the connector, so as to allow an inserting end (an insertion end) thereof to be located beyond the sealing member, and the annular engagement projection to be snap-engaged with the connector. The annular verification projection is located in or near an opposite axial end of the connector or on an opposite axial side of an opposite axial end of the connector when the pipe is inserted in and connected to the connector. And, the connector clip for verifying complete connection between a connector and a pipe according to the present invention, for example, comprises a clip body (cap body) on one axial side thereof and a connection verifying portion on an opposite axial side thereof. The clip body includes a connector receiving recess of U-shape in cross-section (generally U-shape such as trough-shape in cross-section falls under "U-shape in cross-section") and provided with a radially inwardly directed extending portion on one axial end thereof. The connection verifying portion is provided on an opposite axial side of the clip body and includes a pipe receiving recess of U-shape in cross-section (generally U-shape such as trough-shape in cross-section falls under "U-shape in cross-section") with width equal to or generally equal to an outer diameter of a body of the pipe. The connector receiving recess of the clip body is formed to receive a large diameter portion on an opposite axial side of the connector therein, while the pipe receiving recess of the connection verifying portion is formed to receive an opposite axial side of the annular verification projection with respect to the pipe therein. The radially inwardly directed extending portion and the connection verifying portion are arranged so as to hold (for example, clip) a held portion from one axial end of the large diameter portion (for example, a radially extending portion of the large diameter portion) to the annular verification projection of the pipe from axially opposite ends thereof. The connector clip further comprises reinforcement rib formed integrally on an outer peripheral surface of the connection verifying portion to increase widening (opening) resistance of the pipe receiving recess. The clip body and the connection verifying portion are integrally connected with one another via a connection part (for example, connection piece or connection block). Here, the tube connecting portion means or indicates connecting portions for a wide variety of mating members to be joined with a pipe. Also, terms "axial" and "axial direction" means a direction of an axis of a connector, a connector housing, a pipe or any relevant member.

A fit-on recess, for example, of U-shape (generally U-shape such as trough-like shape falls under "U-shape") is defined in an inside (inner) surface or inside (inner) peripheral edge of the radially inwardly directed extending portion. The connector clip is mounted to a connector and a pipe so that a portion on one axial side of (from or beyond) the large diameter portion (thick portion) of the connector and adjacent to one axial end thereof is received, for example, snappingly, in the fit-on recess of the radially inwardly directed extending portion, the large diameter portion is received in the connector receiving recess of the clip body, and an opposite axial side of (from or beyond) the annular verification projection with respect to the pipe is received in the pipe receiving recess of the connection verifying portion. A portion or held portion from one axial end of the large diameter portion of the connector to the annular verification projection of the pipe is held or clipped by the radially inwardly directed extending portion of the clip body and the connection verifying portion from axially opposite ends thereof The radially inwardly directed extending portion and the connection verifying portion hold the portion axially from one axial end of the large diameter portion to the annular verification projection not axially spaced or slightly axially spaced. That is, an axial distance between the radially inwardly directed extending portion and the annular verification projection is designed equal to or generally equal to an axial distance between one axial end of the large diameter portion and the annular verification projection (an opposite axial end of the annular verification projection) when the pipe is correctly connected to the connector. Therefore, if the pipe is incompletely connected to the connector and the annular verification projection of the pipe is located toward an opposite axial direction, when the connector clip is tried to be mounted to the connector and the pipe, the annular verification projection is located on a side of the connection verifying portion of the connector clip. However, as a width of the pipe receiving recess of the connection verifying portion is equal to or generally equal to an outer diameter of a body of the pipe (a portion of the pipe except the annular engagement projection and the annular verification projection), the body of the pipe is allowed to be fitted in the pipe receiving recess but the annular verification projection is not allowed to be fitted therein. As a result, interference or abutment is caused between the annular verification projection of the pipe and the connection verifying portion, and thereby the connector clip cannot be mounted to the connector and the pipe. So, when the connector clip is successfully mounted thereto, it means that the pipe is completely connected to the connector.

According to the present invention, reinforcement rib is formed integrally on an outer surface or an outer peripheral surface of the connection verifying portion in order to increase widening (opening) resistance of the pipe receiving recess. And, as the connection verifying portion and the clip body are integrally connected with one another via or by a connection part, widening action or widening ability of the connector receiving recess of the clip body is not at all, hardly or not so much affected by the reinforcement rib. Therefore, the connector receiving recess may be configured relatively easy to be widen, while the pipe receiving recess of the connection verifying portion may be configured difficult to be widen. Then, even if the connector receiving recess of the clip body is constructed to embrace or clip the large diameter portion of the connector from a widthwise direction and the pipe receiving recess of the connection verifying portion is formed difficult to be widen, it is possible not to deteriorate favorable mounting property of the connector clip. Further, even if the connector receiving recess of the clip body is configured to have a width equal to or generally equal to the large diameter portion of the connector and the pipe receiving recess of the connection verifying portion is formed difficult to be widen, it is possible to keep favorable mounting property of the connector clip without affecting property of receiving the connector in the clip body. The connection part may be constructed so as to connect an opposite side of the U-shaped opening of the connection verifying portion and an opposite side of the U-shaped opening of the clip body.

An axial length of the connection verifying portion is preferably designed longer than an axial length between the annular engagement projection and the annular verification projection of the pipe. In such construction, in case that the pipe is incompletely connected to the connector, the annular verification projection of the pipe is located toward an opposite axial side, and is to be located on an opposite axial side of the connection verifying portion of the connector clip (on an opposite axial side from or beyond the connection verifying portion of the connector clip), if the connector clip is tried to be mounted to the connector and the pipe, the annular engagement projection is located on a side of the connection verifying portion of the connector clip. However, as a width of the pipe receiving recess is equal to or generally equal to an outer diameter of the body of the pipe, the annular engagement projection is not allowed to be fitted in the pipe receiving recess. Consequently, interference or abutment is caused between the annular engagement projection of the pipe and the connection verifying portion, and the connector clip cannot be mounted to the connector and the pipe.

The connection verifying portion may include a verifying body formed with the reinforcement rib or ribs, and a snap-fit portion formed on an opposite axial side of the verifying body to snap-fit on the pipe. In such construction, the connector clip is mounted to the connector and the pipe, for example, such that the portion adjacent to the large diameter portion and the pipe are snap-fitted in the radially inwardly directed extending portion and the snap-fit portion. And if the verifying body and the snap-fit portion are integrally connected with one another via or by a joint part (for example, joint piece or joint block), widening action or widening ability of the snap-fit portion or the pipe receiving recess of the snap-fit portion is not at all affected, hardly affected, or not so much affected by the reinforcement rib. That is, the snap-fit portion or the pipe receiving recess of the snap-fit portion may be constructed relatively easy to be widen, while the pipe receiving recess of the verifying body may be constructed difficult to be widen. In such construction, even if the pipe receiving recess of the verifying body is constructed difficult to be widen, it is possible not to lower favorable mounting ability of the connector clip.

The joint piece may be formed so as to join an opposite side of the U-shaped opening of the verifying body and an opposite side of the U-shaped opening of the snap-fit portion.

In case of a connector clip where an annular verification projection is allowed to enter between a verification body and a snap-fit portion, for example, a distance between the verifying body and the snap-fit portion is greater than a thickness of the annular verification projection, it might happen that the connector clip is mounted to the connector and the pipe even when the pipe is incompletely connected to the connector. So, it is effective to design the verifying body with such axial length that an inserting end of the pipe is retracted to a position generally corresponding to an opposite axial end of the sealing member or to a position on an opposite axial side of (from or beyond) an opposite axial end of the sealing member when the annular verification projection is located between the verifying body and the snap-fit portion. In such construction, even if the connector clip happens to be successfully mounted to the connector and the pipe although the pipe is incompletely connected to the connector, the inspection fluid certainly leaks out between the connector and the pipe at inspection to verify connection by flowing inspection fluid in the connector and the pipe. Therefore, it can be verified that the pipe is incompletely connected to the connector.

Meanwhile, an axial length of the verifying body may be designed longer than an axial length between the annular engagement projection and the annular verification projection of the pipe. In such construction, in case that the pipe is incompletely connected to the connector, the annular verification projection of the pipe is located toward an opposite axial direction and is to be located between the verifying body and the snap-fit portion, if the connector clip is tried to be mounted to the connector and the pipe, the annular engagement projection is located on a side of the connection verifying portion (a side of the verifying body), and thereby the connector clip cannot be mounted thereto.

As described above, the connector clip for verifying complete connection between a connector and a pipe according to the present invention can be easily mounted to a connector and a pipe, with little possibility to be mounted thereto when the pipe is incompletely connected to the connector.

Now, the preferred embodiments of the present invention will be described in detail with reference to the drawings.

DETAILED DESCRIPTIONS OF PREFERRED EMBODIMENTS

Figure 1:
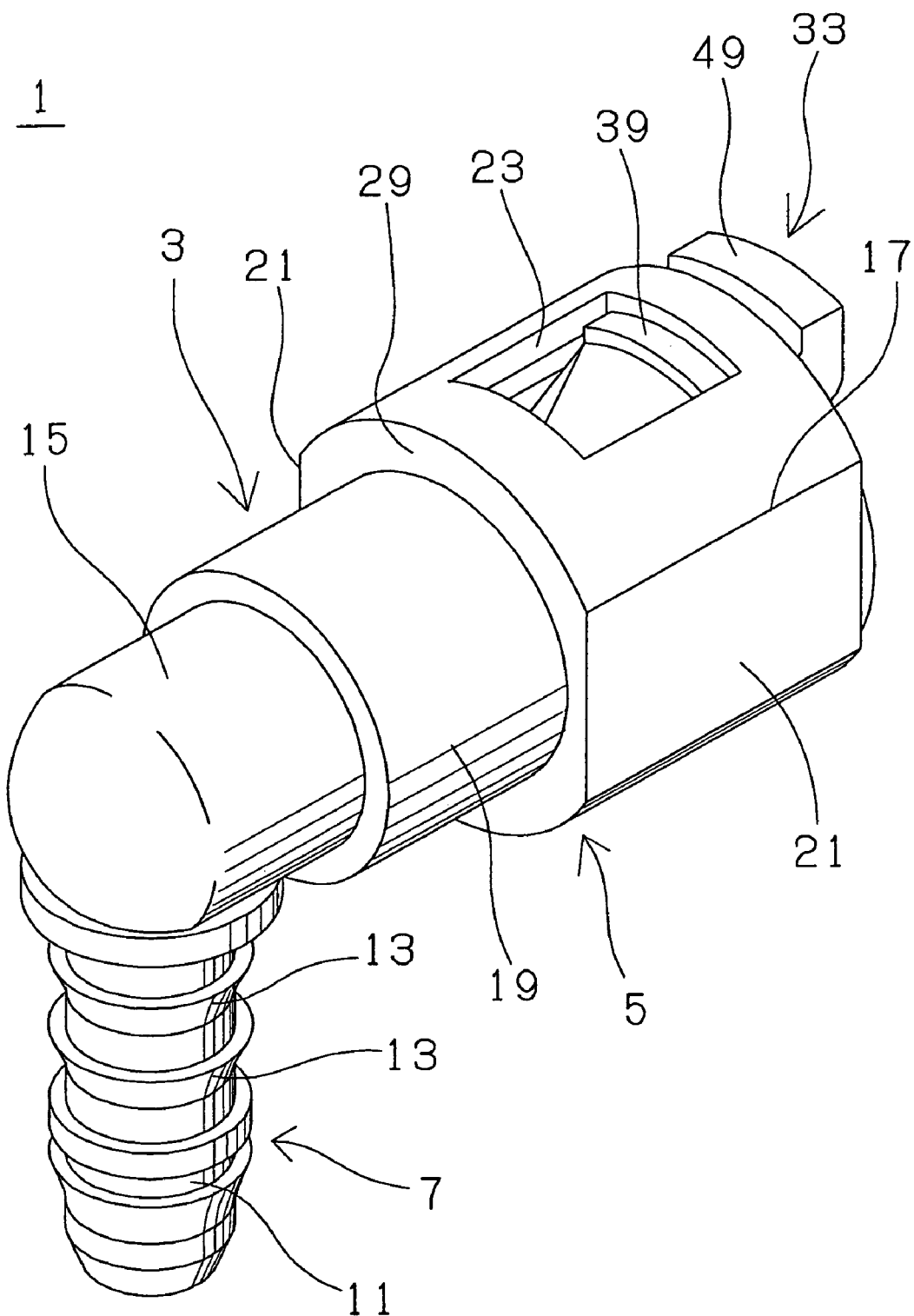
FIG. 1 is a perspective view of a connector to which a connector clip for verifying complete connection between a connector and a pipe according to the present invention is mounted.
Figure 2:
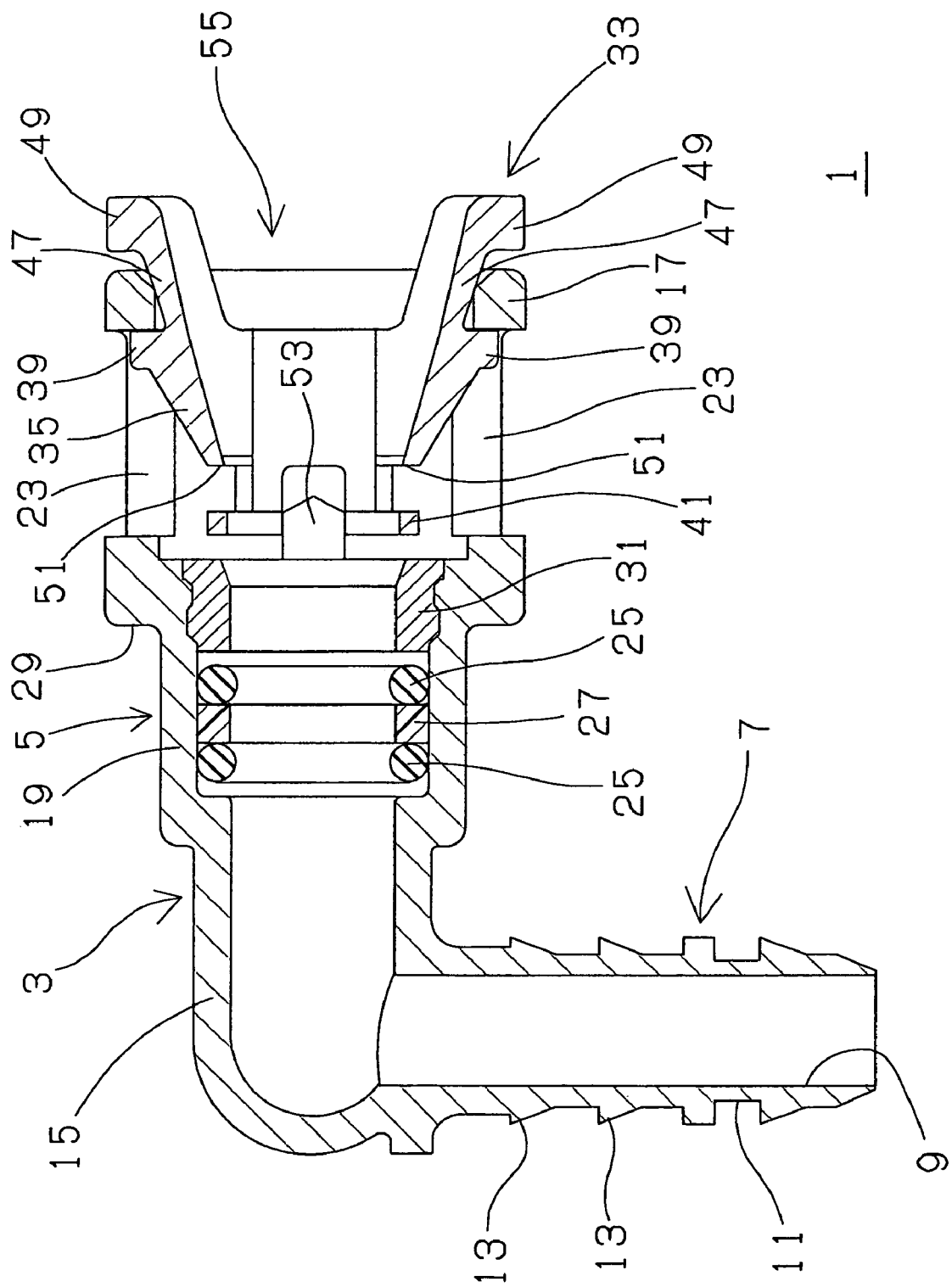
FIG. 2 is a sectional view of the connector.

As well shown in FIGS. 1 and 2, a connector or quick connector 1, to which a connector clip (cap) for verifying complete connection between a connector and a pipe or a connector clip for preventing incomplete connection between a connector and a pipe according to the present invention is applied, is used for joint construction in a gasoline fuel piping for vehicle. The connector 1 has a tubular connector housing 3, for example, made of glass fiber reinforced polyamide (PA/GF). The connector housing 3 includes a pipe inserting portion 5, and a resin tube connecting portion 7 on one axial side of the pipe inserting portion 5, in bent relation (here at a right angle) with respect to the pipe inserting portion 5, or at an angle from the pipe inserting portion 5 (here at an angle of 90° or perpendicularly therefrom) as a unit. The connector housing 3 also includes a through bore 9 through from an opposite axial end (rear end) of the pipe inserting portion 5 to one axial end (leading end) of the resin tube connecting portion 7. The resin tube connecting portion 7 is formed with a seal fit portion 11 on an outer peripheral surface thereof and two annular stop ribs 13 in axially spaced relation with one another on the outer peripheral surface thereof. A seal ring (not shown) is fitted on the seal fit portion 11, then, a resin tube (not shown) of relatively high rigidity is tightly fittingly connected to an outer periphery of the resin tube connecting portion 7 of the connector 1.

The pipe inserting portion 5 has a cylindrical transitional portion 15 on one axial side thereof which is continued integrally to the resin tube connecting portion 7, a tubular holding portion 17 of large diameter (large diameter portion) on an opposite axial side thereof, and a cylindrical sealing portion 19 in the middle axially thereof, sized smaller than the tubular holding portion 17 in diameter, but larger than the cylindrical transitional portion 15 in diameter. An outer peripheral surface of the tubular holding portion 17 of the pipe inserting portion 5 includes planar portions 21 located in diametrically symmetrical positions thereof, and engagement windows 23 formed in opposed relations with one another in arcuate peripheral wall portions arranged between the planar portions 21. In the cylindrical sealing portion 19 of the pipe inserting portion 5, a pair of O-rings 25 (sealing members) are fitted in axially side-by-side relation with a collar 27 therebetween within the inner peripheral surface thereof A stepped end surface 29 (radially extending portion of the large diameter portion) is defined on one axial end of an outer surface of the tubular holding portion 17 or between the outer peripheral surface of the tubular holding portion 17 and an outer peripheral surface of the cylindrical sealing portion 19. A numeral reference 31 in FIG. 2 indicates a resin bush which is fitted over an inner peripheral surface of the tubular holding portion 17 and an inner peripheral surface of the cylindrical sealing portion 19 to prevent displacement of the O-rings 25.

Figure 3:
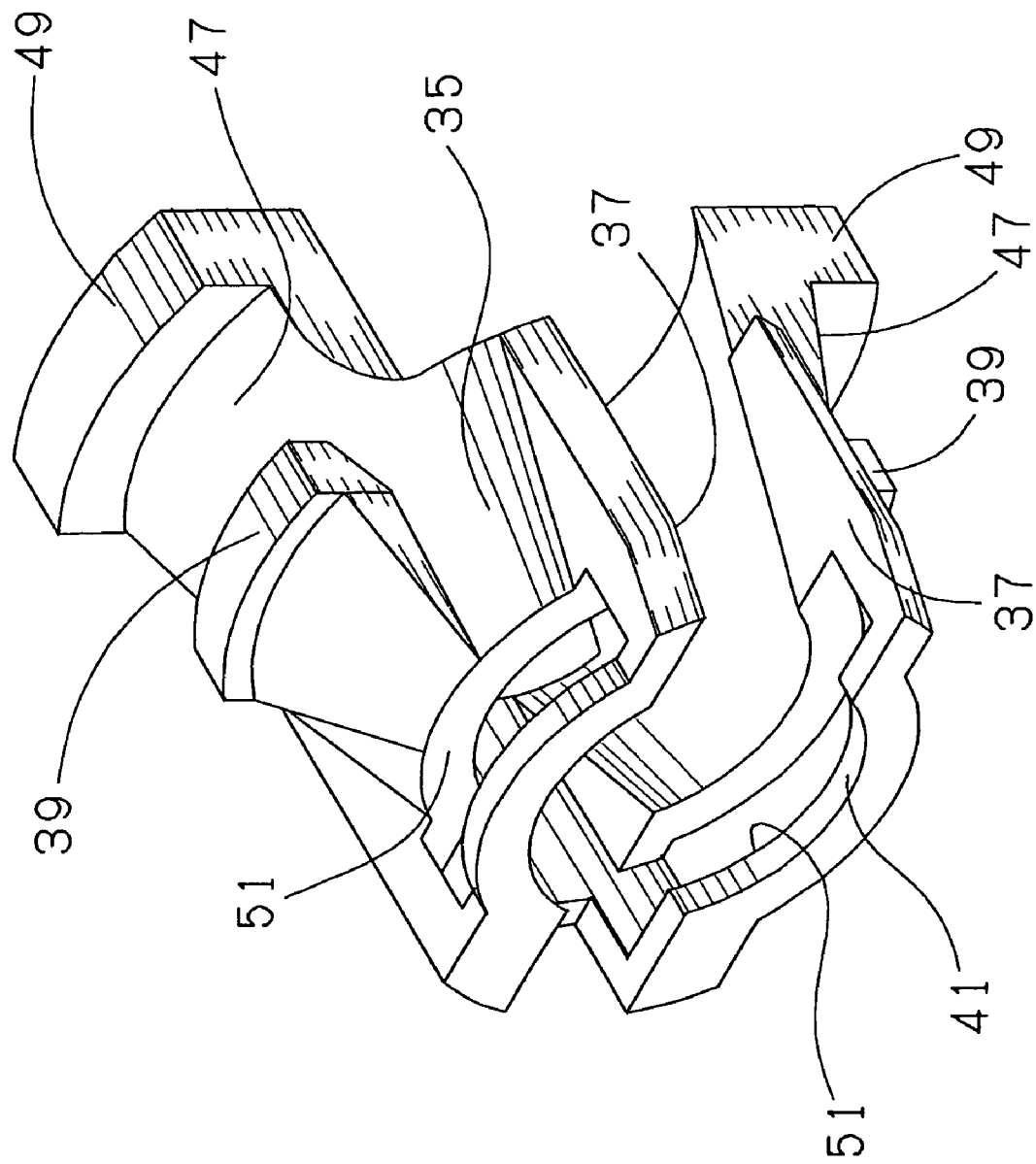
FIG. 3 is a perspective view of a retainer to be fitted in the connector.

A retainer 33, for example, made of PA is fitted in the tubular holding portion 17 of the pipe inserting portion 5. This retainer 33 is relatively flexible, and is formed so as to be resiliently deformable. As well understood with reference to FIG. 3, the retainer 33 has a main body 35 of C-shape in cross-section wherein a relatively large space for deformation is defined between circumferentially opposite end portions 37 thereof The main body 35 is provided with a pair of stopper portions 39 projecting radially outwardly in diametrically symmetrical positions in an opposite axial end portion thereof An inner surface of the main body 35 tapers generally in the direction to one axial side thereof so as to reduce gradually an inner diameter thereof except the circumferentially opposite ends 37 and a portion opposed to the space for deformation. One axial end portion of the main body 35 serves as an engagement portion 41, generally defining an inner diameter smaller than an outer diameter of an annular engagement projection 43 on an outer peripheral surface of one axial side or an inserting or insertion end portion of the pipe 45 (refer to FIG. 4), and substantially identical to an outer diameter of a body of the pipe 45, except the circumferentially opposite ends 37 and a portion opposed to the space for deformation.

A pair of operation arms 47 are integrally formed on an opposite axial end of the main body 35 of the retainer 33 so as to extend inclining radially outwardly in an opposite direction axially from respective circumferential positions corresponding to the stopper portions 39. The operation arms 47 have latching ends 49 projecting radially outwardly on an opposite axial end portions thereof respectively. The engagement portion 41 of the main body 35 is provided with a pair of engagement slits 51 extending circumferentially in opposed relation with one another. Thus configured retainer 33 is inserted and fitted in the tubular holding portion 17 of the pipe inserting portion 5, so that the stopper portions 39 are seated in the engagement windows 23, and that the latching ends 49 are in engagement relation with the tubular holding portion 17 on an opposite axial end thereof A numeral reference 53 in FIG. 2 indicates rotational movement restraint projection which is formed integrally in an inner surface of the tubular holding portion 17. The rotational movement restraint projection 53 is configured to seat in a cutaway of the retainer 33 to prevent rotational movement of the retainer 33.

Figure 4:
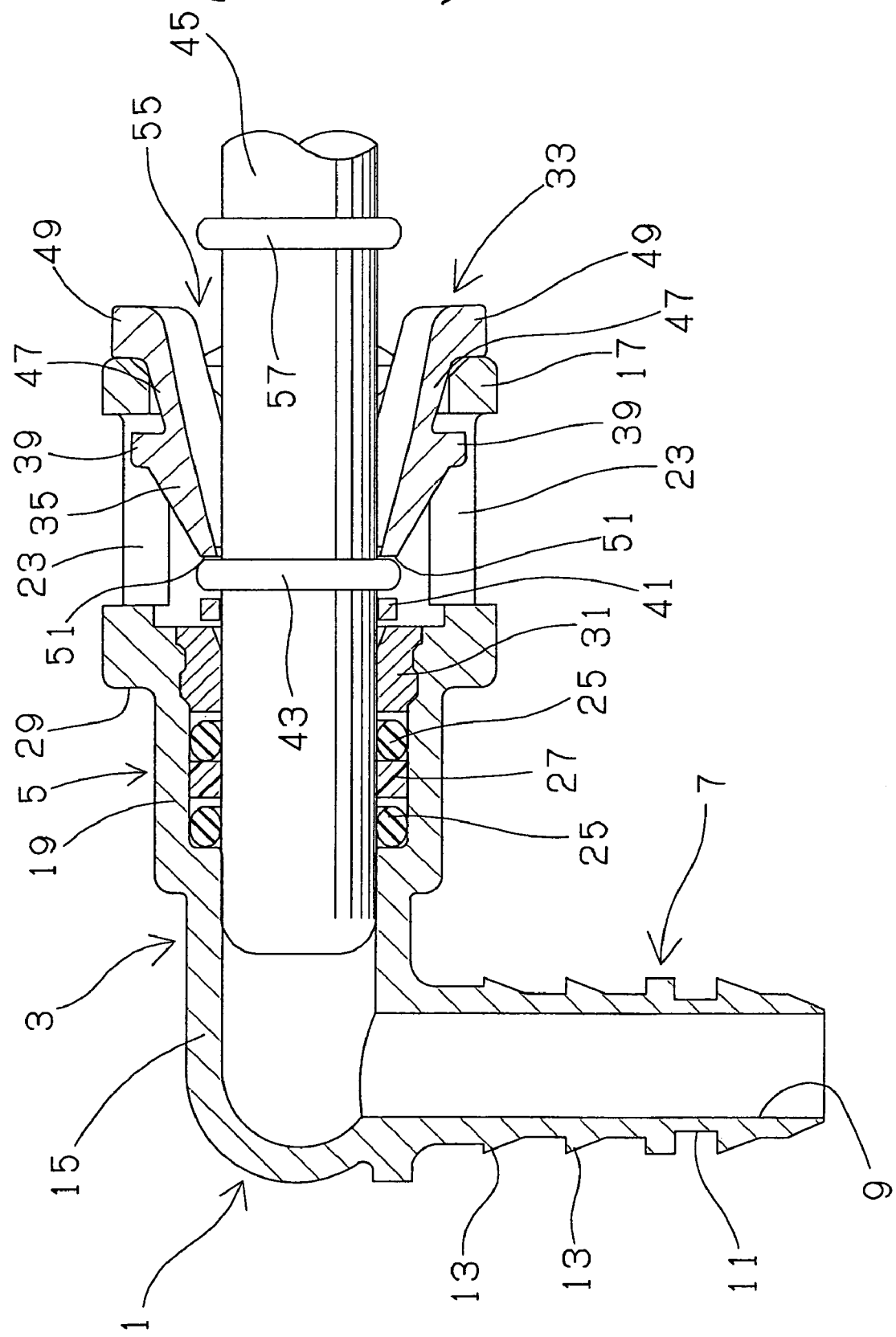
FIG. 4 is a sectional view showing the case that a pipe is inserted in and connected to the connector.

As well understood with reference to FIG. 4, the pipe 45 to be jointed to a resin tube is relatively pushed, and fittingly inserted into an opening 55 on an axial end of the pipe inserting portion 5 of the connector housing 3 or the connector 1 so that the annular engagement projection 43 progresses radially expanding an inner surface of the main body 35 of the retainer 33 until the annular engagement projection 43 seats in the engagement slits 51 in snap-engagement relation therewith. The pipe 45 is further provided with an annular verification projection 57 with same or substantially same configuration as the annular engagement projection 43 on an outer peripheral surface of an opposite axial side of (from or beyond) the annular engagement projection 43. The annular verification projection 57 is arranged on the pipe 45 so as to be located axially outer side or an opposite axial side of or beyond the opening 55 on an axial end of the pipe inserting portion 5 or the latching end 49 of the retainer 33, while the pipe 45 is correctly inserted in and fittingly connected to the connector 1 so that the annular engagement projection 43 seats in and engages with the engagement slits 51 of the retainer 33. The annular engagement projection 43 which has fitted in and snap-engaged with the engagement slits 51 of the main body 35 of the retainer 33 blocks or limits further axial in-and-out movement of the pipe 45 with respect to the connector 1. That is, the pipe 45 is thereby almost locked against relative axial movement in the connector 1. One axial end or an inserting or insertion end of the pipe 45 reaches in the cylindrical transitional portion 15 beyond a pair of the O-rings 25 within the cylindrical sealing portion 19, and thereby a seal is formed by the O-rings 25 between an outer peripheral surface of the pipe 45 and the inner peripheral surface of the pipe inserting portion 5 of the connector housing 3

In the event of removing the pipe 45 from the connector 1, the latching ends 49 of the operating arms 47 of the retainer 33 are pressed radially inwardly from outside to narrow a radial space between the operating arms 47 thus a radial space between the stopper portions 39. And, thereby the stopper portions 39 are out of the engagement windows 23 and the retainer 33 can be relatively pulled out of the connector housing 3. As the retainer 33 is relatively pulled out of the connector 1, the pipe 45 is also pulled out of the connector housing 3 along with the retainer 33.

Figure 5:
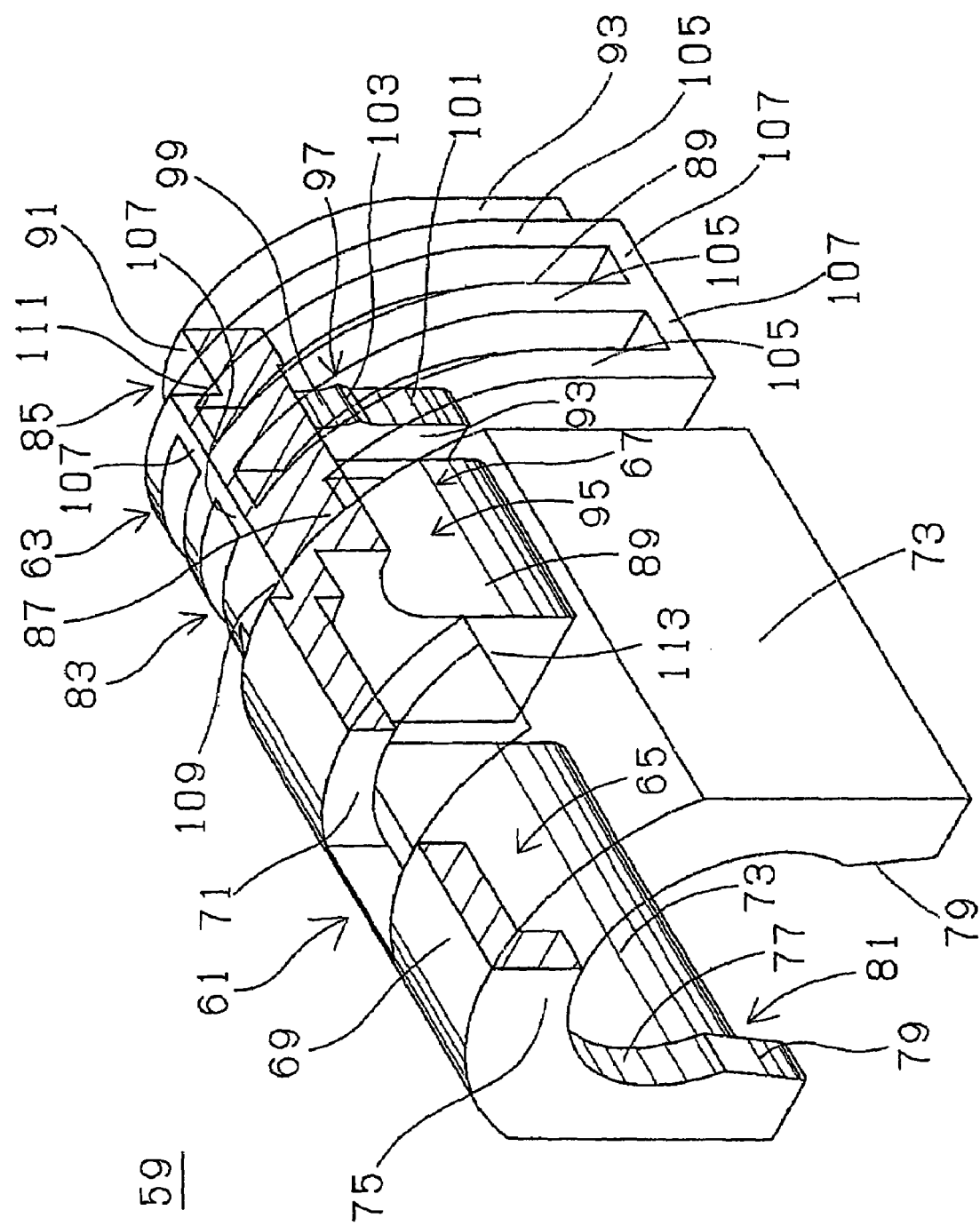
FIG. 5 is a perspective sectional view of the connector clip for verifying complete connection between a connector and a pipe according to the present invention.
Figure 6:
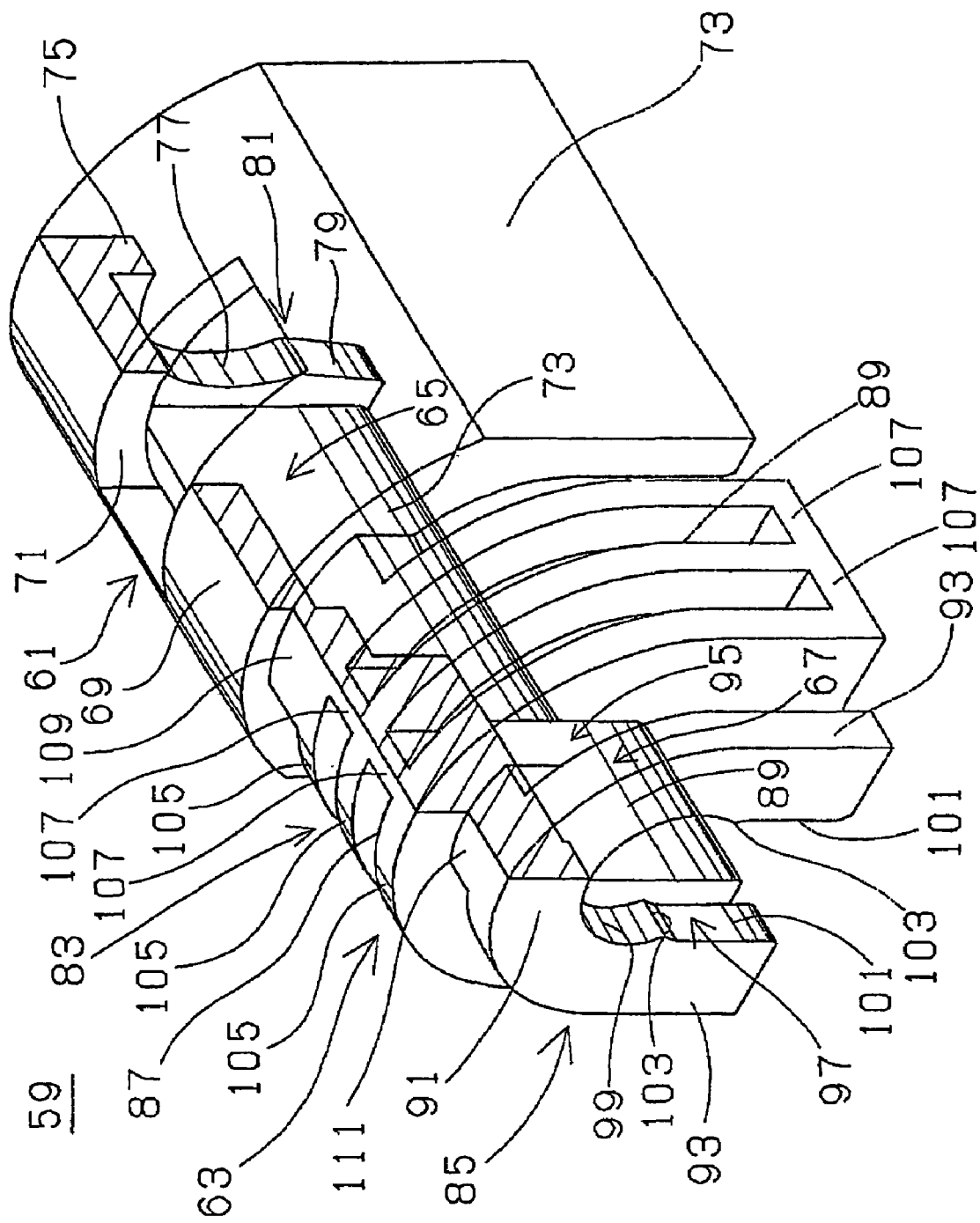
FIG. 6 is another perspective sectional view of the connector clip for verifying complete connection between a connector and a pipe according to the present invention.

For a connector clip (cap) 59 for verifying complete connection between a connector and a pipe, shown in FIGS. 5 and 6, to be put on and mounted to the connector 1 and the pipe 45, thermoplastic resin is widely used as material. If heat resistant property is required, polyamide type resin such as PA11, PA12 and PA66 or nylon is adapted. Polypropylene type resin such as PP or polyester type resin may be adapted to achieve cost reduction.

Figure 7:
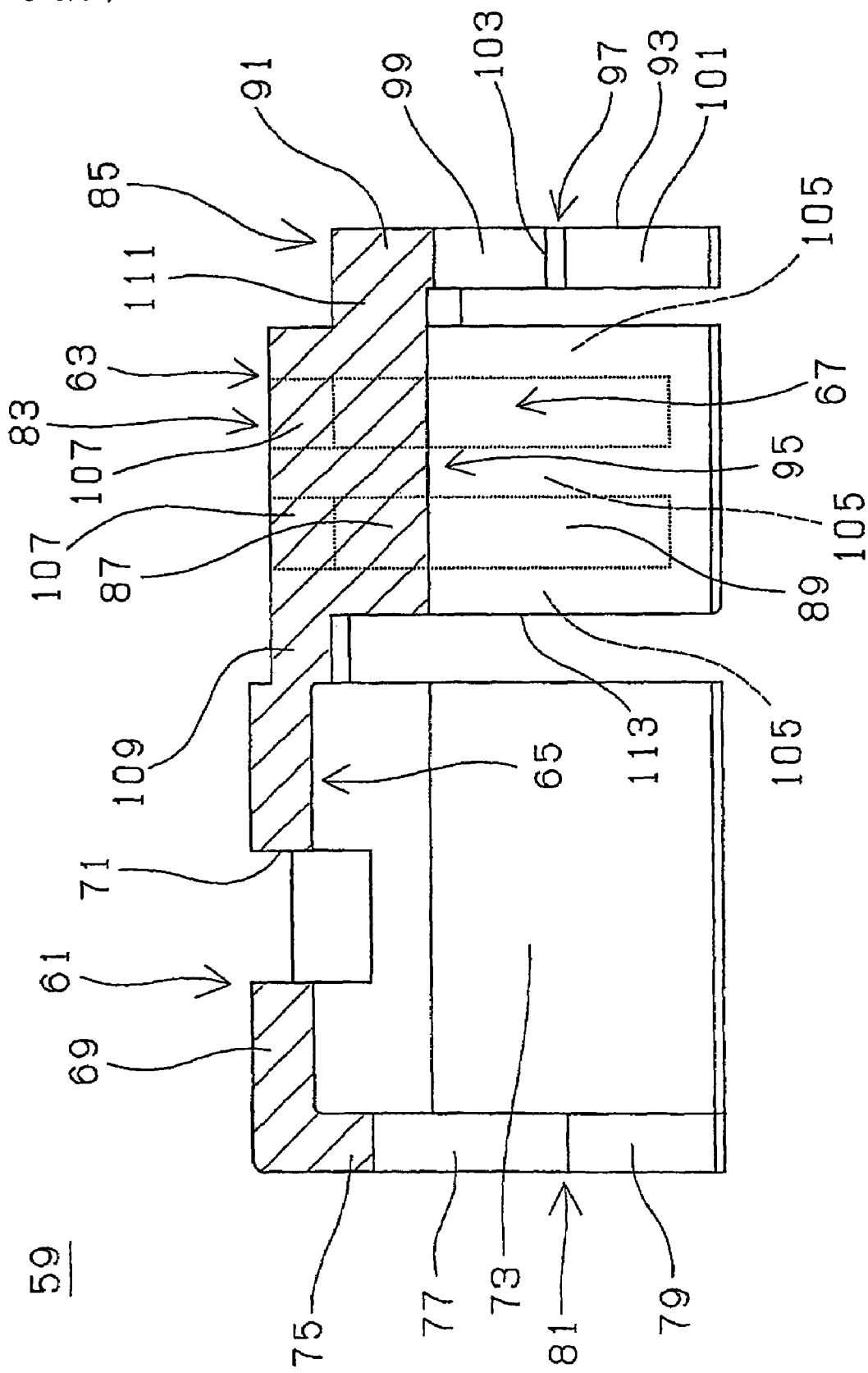
FIG. 7 is a sectional view of the connector clip for verifying complete connection between a connector and a pipe according to the present invention.

As well shown in FIGS. 5 to 7, the connector clip 59 is constructed overall in a form of U-shape in cross-section so as to be put on and mounted to the connector housing 3 and the pipe 45 via a side of a U-shaped opening extending longitudinally or axially of the connector housing 3 and the pipe 45. The connector clip 59 has a clip body (cap body) 61 of U-shape in cross-section on one axial side thereof, and a connection verifying portion 63 also of U-shape in cross-section on an opposite axial side thereof as a unit. The clip body 61 internally has an connector receiving inner portion 65 (connector receiving recess) of U-shape in cross-section to receive a portion from the tubular holding portion 17 of the connector housing 3 or the stepped end surface 29 of the tubular holding portion 17 to the latching ends 49 of the retainer 33 or a position slightly on an opposite axial side of or beyond the latching ends 49. The connection verifying portion 63 internally has a pipe receiving portion 67 to receive an opposite axial side of (from or beyond) the annular verification projection 57 with respect to the pipe 45.

The clip body 61 includes a first arcuate wall portion 69 curved through an arc of smaller or slightly smaller than 180° and formed with a drain opening 71 on a mid portion thereof, a pair of flat first side-wall portions 73 connected integrally to the first arcuate wall portion 69 on widthwise opposite ends thereof, and a radially inwardly directed extending portion 75 formed integrally on the first arcuate wall portion 69 and the first side-wall portions 73 on one axial ends thereof. The radially inwardly directed extending portion 75 is formed of U-shape so as to slightly protrude inwardly or more inwardly than the connector receiving inner portion 65. The connector receiving inner portion 65 is defined by inner surfaces of the first arcuate wall portion 69 and the first side-wall portions 73. The first arcuate wall portion 69 is formed to have an inner surface corresponding to an outer surface of the arcuate peripheral wall portion of the tubular holding portion 17. A pair of the first side-wall portions 73 are arranged parallel to each other and with a space generally equal to that between a pair of the planer portions 21, 21 of the tubular holding portion 17. A U-shaped inside (inner) surface or inside (inner) edge of the radially inwardly directed extending portion 75 defines an arcuate fit-on portion 77 and a lead-in portion 79. The arcuate fit-on portion 77 is formed in an arc of slightly larger than 180°, with an inner diameter equal to or generally equal to an outer diameter of the cylindrical sealing portion 19 of the connector housing 3, and open toward a U-shaped opening side. The lead-in portion 79 is extending so as to be widened gradually from opening ends of the arcuate fit-on portion 77 to ends of the U-shaped opening. The arcuate fit-on portion 77 and the lead-in portion 79 define a connector snap-fit recess or connector clip recess (connector fit-on recess)81.

The connection verifying portion 63 includes a verifying body 83 and a snap-fit portion 85 provided on an opposite axial side of the verifying body 83. The verifying body 83 is constructed by a semicircular second arcuate wall portion 87 arranged concentric with the first arcuate wall portion 69 and a pair of flat second side-wall portions 89 integrally connected to the second arcuate wall portion 87 at widthwise opposite ends thereof The snap-fit portion 85 is constructed by a semicircular arcuate portion 91 arranged concentric with the second arcuate wall portion 87 and a pair of side portions 93 integrally connected to the arcuate portion 91 at widthwise opposite ends thereof. The pipe receiving recess 67 is constructed by a verifying recess 95 of U-shape in cross section defined by inner surfaces of the second arcuate wall portion 87 and the second side-wall portions 89, and a pipe snap-fit recess or pipe clip recess 97 of U-shape defined by inside (inner) surface or inside (inner) edge of the arcuate wall portion 91 and side portions 93.

A second arcuate wall portion 87 of the verifying body 83 is designed to have an inner surface with an inner diameter equal to or generally equal to an outer diameter of the body of the pipe 45. A pair of the second side-wall portions 89 of the verifying body 83 are arranged in parallel relation with one another, spaced by a distance equal to or generally equal to an outer diameter of the body of the pipe 45.

The arcuate portion 91 of the snap-fit portion 85 is designed to have an semicircular inner surface with an inner diameter equal to or generally equal to an outer diameter of the body of the pipe 45. A pair of the side portions 93 of the snap-fit portion 85 are arranged in parallel relation with one another, spaced by a distance equal to or generally equal to an outer diameter of the body of the pipe 45. Therefore, the pipe snap-fit recess 97 is constructed by a semicircular fit-on portion 99 with an inner diameter equal to or generally equal to an outer diameter of the body of the pipe 45 and open on a U-shaped opening side, and a another lead-in portion 101 extending from opening ends of the semicircular fit-on portion 99 to ends of the U-shaped opening, spaced by a fixed distance. And, a pair of snap ridges 103 are formed at border positions between the another lead-in portion 101 and the semicircular fit-on portion 99 respectively.

And, reinforcement ribs 105 of identical configuration are formed integrally, on one axial end portion, an axially middle portion and an opposite axial end portion of an outer surface or an outer peripheral surface of the verifying body 83 respectively. Each of reinforcement ribs 105 is formed along entire circumference of an outer surface or outer peripheral surface of the verifying body 83 so as to extend from a U-shaped opening end of one second side-wall portion 89, via the second arcuate wall portion 87 to ends of a U-shaped opening of the other second side-wall portion 89. Adjacent reinforcement ribs 105 are integrally joined each other by joint portions 107 formed integrally on an outer surface of the verifying body 83 (the second arcuate wall portion 87) at opposite positions of the U-shaped opening and end portions of the U-shaped opening. Each of joint portions 107 has the same projecting height as the reinforcement ribs 105. The reinforcement ribs 105 are projected so as to correspond to an outer surface of the first side-wall portions 73 of the clip body 61 at widthwise opposite ends, and projected slightly lower than an outer surface of the first arcuate wall portion 69 of the clip body 61 on an opposite arcuate portion of the U-shaped opening.

The clip body 61 and the verifying body 83 are integrally connected via a connection piece or block 109, slightly axially spaced. The connection piece 109 bridges between the clip body 61 and the verifying body 83 such that one axial end of the connection piece 109 is connected integrally to an opposite axial end of the first arcuate wall portion 69 and an opposite axial end thereof is connected integrally to an arcuate portion of the reinforcement rib 105 located on one axial side. The connection piece 109 may be formed into an arcuate part, for example, of the range between 45° and 90°. An axial length of the connection piece 109 or an axial distance between the clip body 61 and the verifying body 83 is designed greater than a thickness of the annular verification projection 57 of the pipe 45, for example, about double of the thickness of the annular verification projection 57.

The verifying body 83 and the snap-fit portion 85 are integrally connected with one another via the joint piece 111, and slightly axially spaced. The joint piece 111 bridges between the verifying body 83 and the snap-fit portion 85 such that one axial end of the joint piece 111 is connected integrally to an opposite axial end of the second arcuate wall portion 87 of the verifying body 83 and an opposite axial end thereof is connected integrally to an arcuate portion 91 of the snap-fit portion 85. The joint piece 111 may be formed into an arcuate part, for example, of the range between 60° and 120°. An axial length of the joint piece 111 or an axial distance between the verifying body 83 and the snap-fit portion 85 is designed slightly greater than a thickness of the annular verification projection 57 of the pipe 45.

Figure 8:
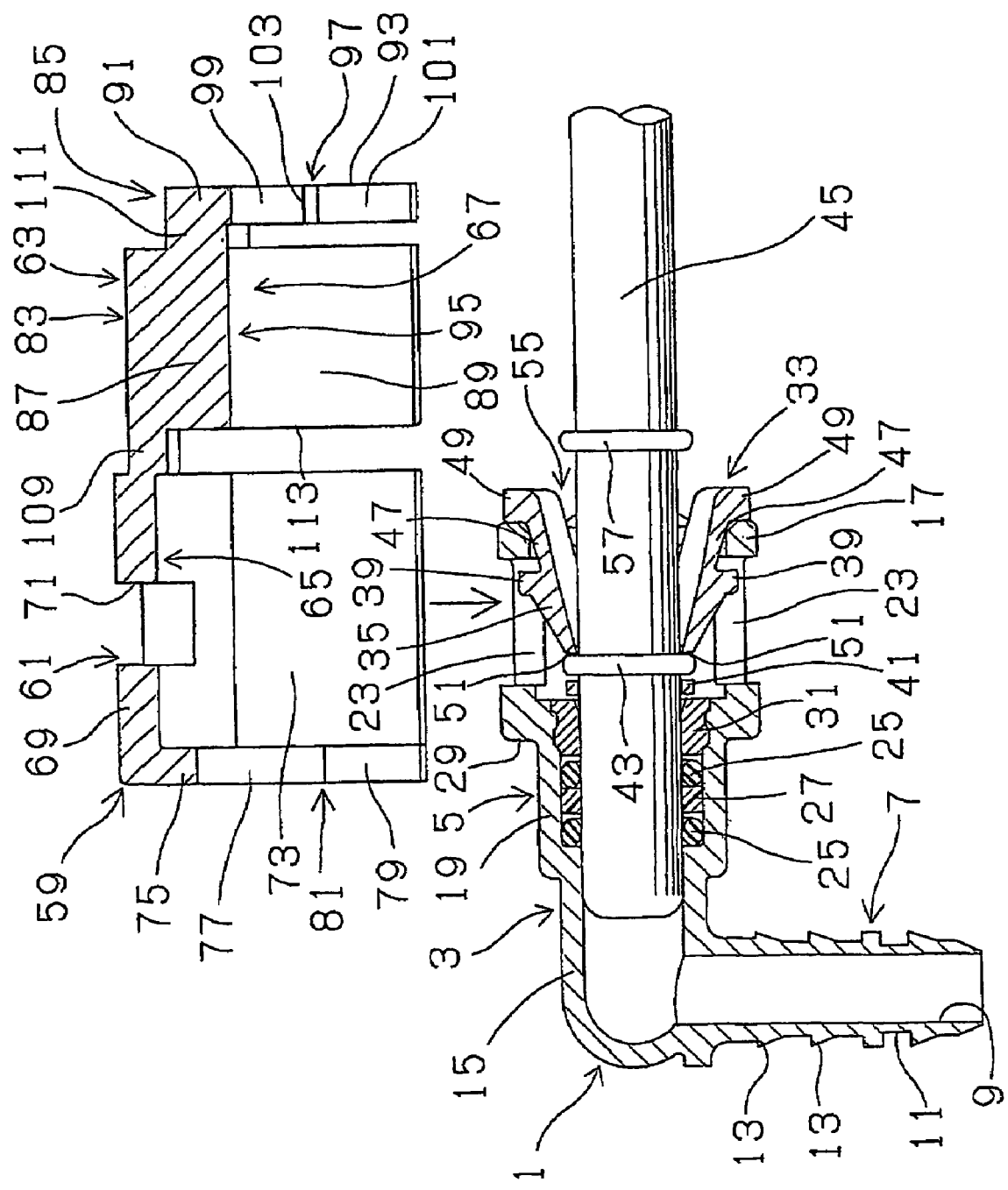
FIG. 8 is an explanatory view showing the case that the connector clip for verifying complete connection between a connector and a pipe according to the present invention is to be mounted to the connector and the pipe.
Figure 9:
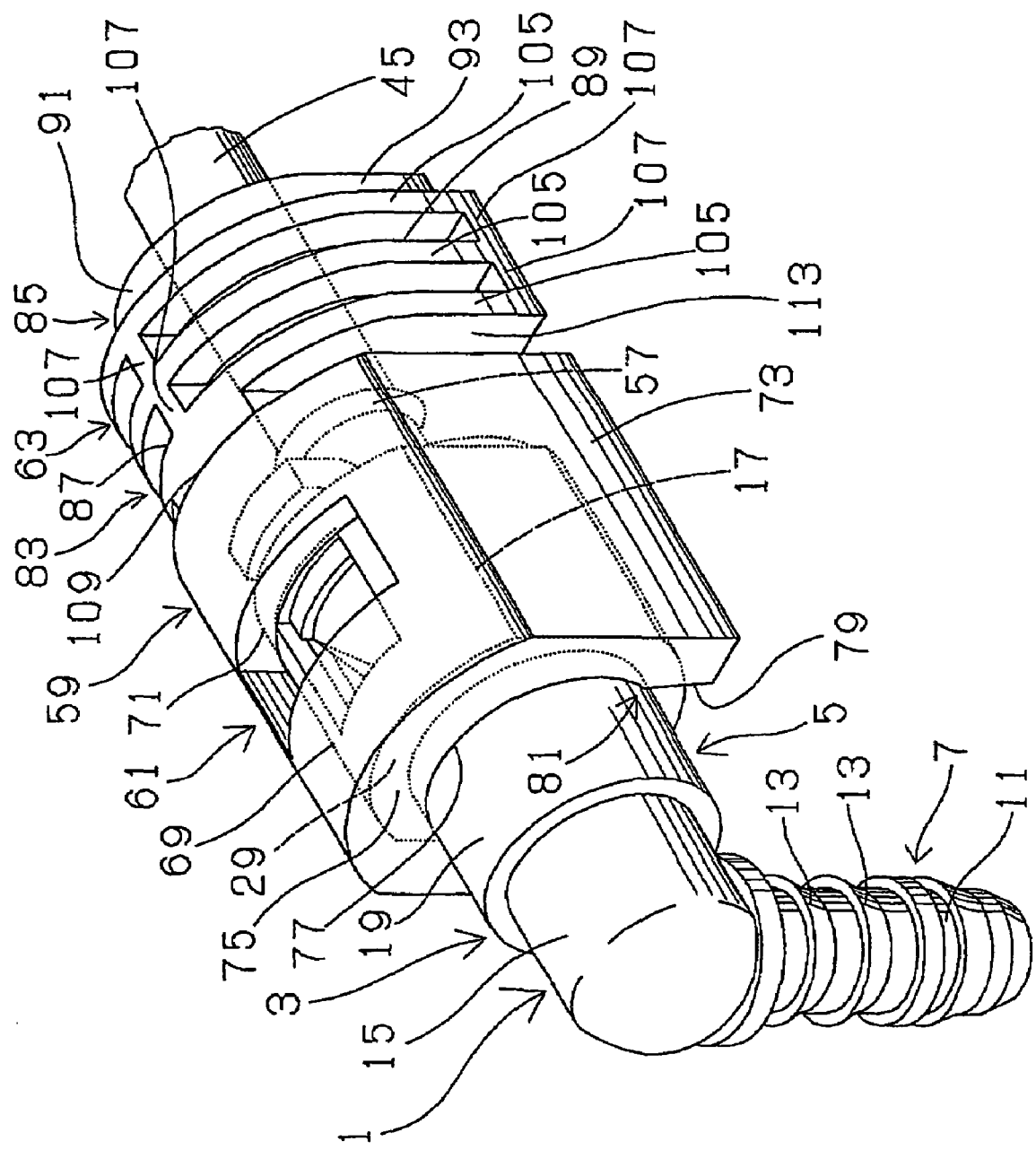
FIG. 9 is a perspective view of the connector clip for verifying complete connection between a connector and a pipe according to the present invention mounted to the connector and the pipe.
Figure 10:
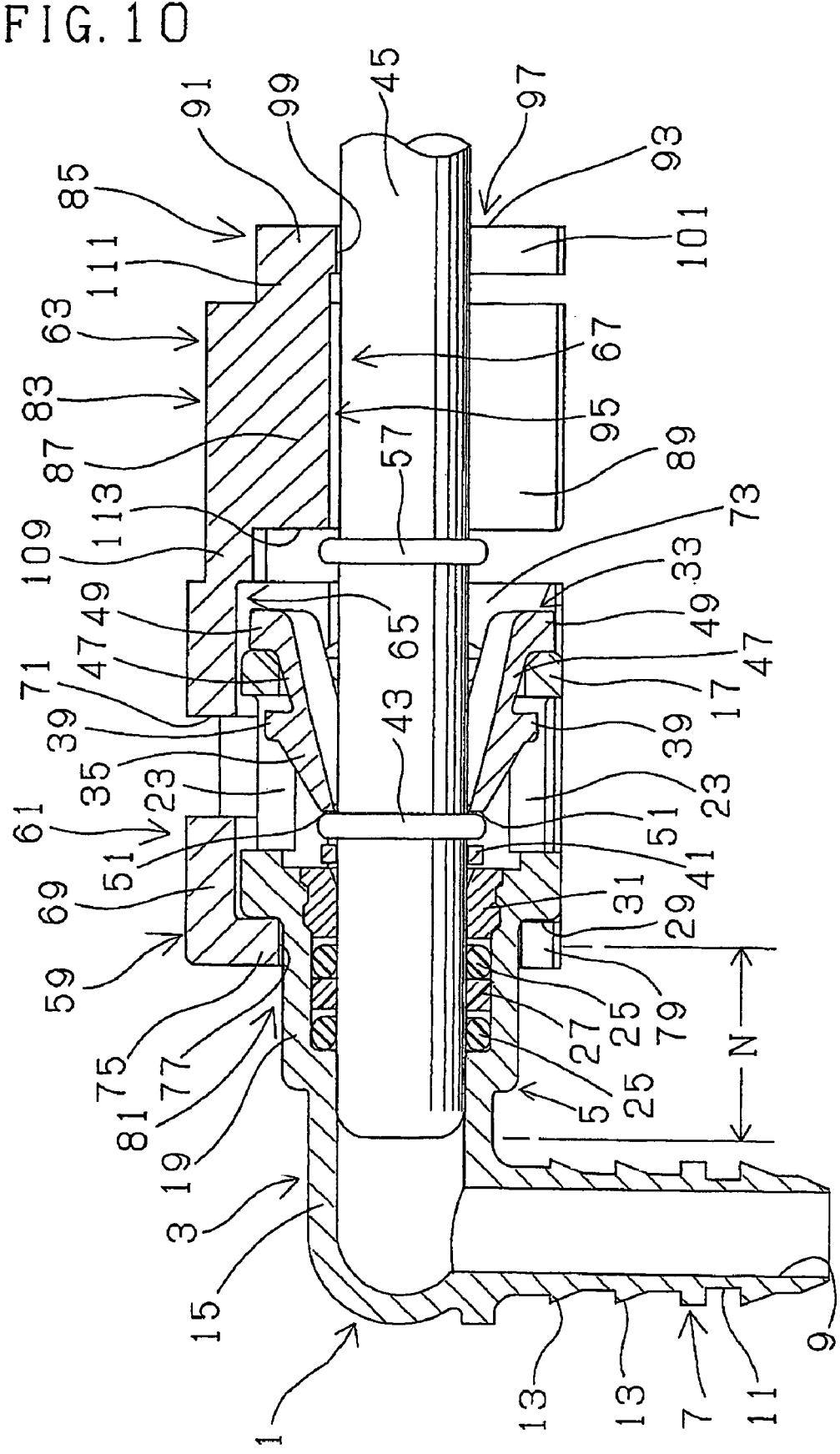
FIG. 10 a sectional view of the connector clip for verifying complete connection between a connector and a pipe according to the present invention mounted to the connector and the pipe.

As well shown in FIGS. 8 to 10, the connector clip 59 is mounted to or on the connector 1 and the pipe 45 so as to locate a pair of the first side-wall portions 73 of the clip body 61 to correspond to the planar portions 21 of the tubular holding portion 17 of the connector 1. As understood also from FIGS. 8 and 9, on the occasion of mounting the connector clip 59, a portion of the cylindrical sealing portion 19, adjacent to the tubular holding portion 17 is passed or moved through the lead-in portion 79 of the radially inwardly directed extending portion 75 and is snap-fitted in the arcuate fit-on portion 77. And, a portion from the tubular holding portion 17 to the latching ends 49,49 of the retainer 33 is received in the connector receiving inner portion 65 of the clip body 61 (an arcuate peripheral wall portion of the tubular holding portion 17 is received in the first arcuate wall portion 69), and the annular verification projection 57 of the pipe 45 seats between the clip body 61 and the verifying body 83. An opposite axial end of the pipe 45, with respect to the annular verification projection, is received in the verifying recess 95 (more specifically, in the second arcuate wall portion 87), a further opposite axial end of the pipe 45 is passed through or moved in the another lead-in portion 101 of the pipe snap-fit recess 97 of the snap-fit portion 85, and snap-fitted in the semicircular second fit-on portion 99. In this manner, connector clip 59 is mounted to the connector 1 and the pipe 45 so as to hold or clip the connector 1 and the pipe 45 from axial opposite ends. That is, by mounting the connector clip 59 thereto, a held portion between the tubular holding portion 17 or the stepped end surface 29 and the annular verification projection 57 of the pipe 45 is held from axial opposite ends by the opposite axial side surface of the radially inwardly directed extending portion 75 and one axial side surface 113 of the verifying body 83, and thereby the pipe 45 is certainly preventing from escaping the connector 1.

Figure 11:
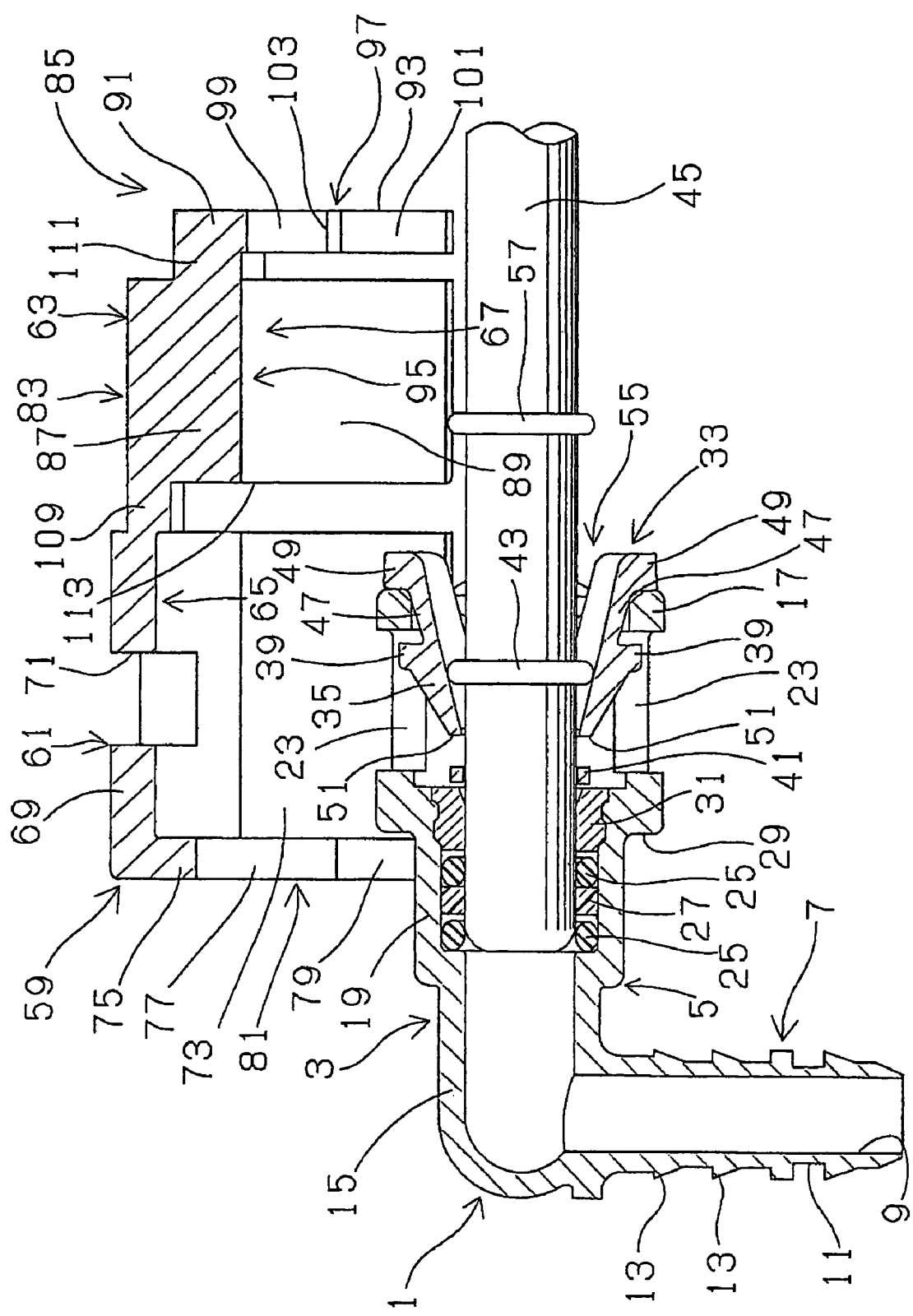
FIG. 11 is an explanatory view showing the case that the connector clip for verifying complete connection between a connector and a pipe according to the present invention is tried to be mounted to the connector and the pipe although the pipe is incompletely connected to the connector.

As shown in FIG. 11, if the pipe 45 is not sufficiently inserted in the connector 1 or the retainer 33 and the annular engagement projection 43 of the pipe 45 does not engage in the engagement slits 51 of the retainer 33, the annular verification projection 57 of the pipe 45 is located further apart toward an opposite axial direction from an opposite axial end of the connector housing 3, compared to the case that the pipe 45 is correctly connected to the connector 1. Therefore, when the connector clip 59 is tried to be mounted to the quick connector 1 and the pipe 45 so that the tubular holding portion 17 is received in the connector receiving inner portion 65 of the clip body 61, the annular verification projection 57 of the pipe 45 is not located so as to seat between the clip body 61 and the verifying body 83 but on a side of the verifying body 83. However, as a width of the verifying recess 95 of the verifying body 83 is designed smaller than an outer diameter of the annular verification projection 57 of the pipe 45, the annular verification projection 57 contacts with or abuts ends of the U-shaped opening of the verifying body 83, and the pipe 45 cannot be received in the verifying recess 95 of the verifying body 83. Therefore, the connector clip 59 cannot be mounted to the connector 1 and the pipe 45. Here, as widening resistance of the verifying recess 95 is increased by forming the reinforcement ribs 105, it is prevented that the annular verification projection 57 seats in the verification recess 95 when the annular verification projection 57 is pushed against the verifying body 83.

Figure 12:
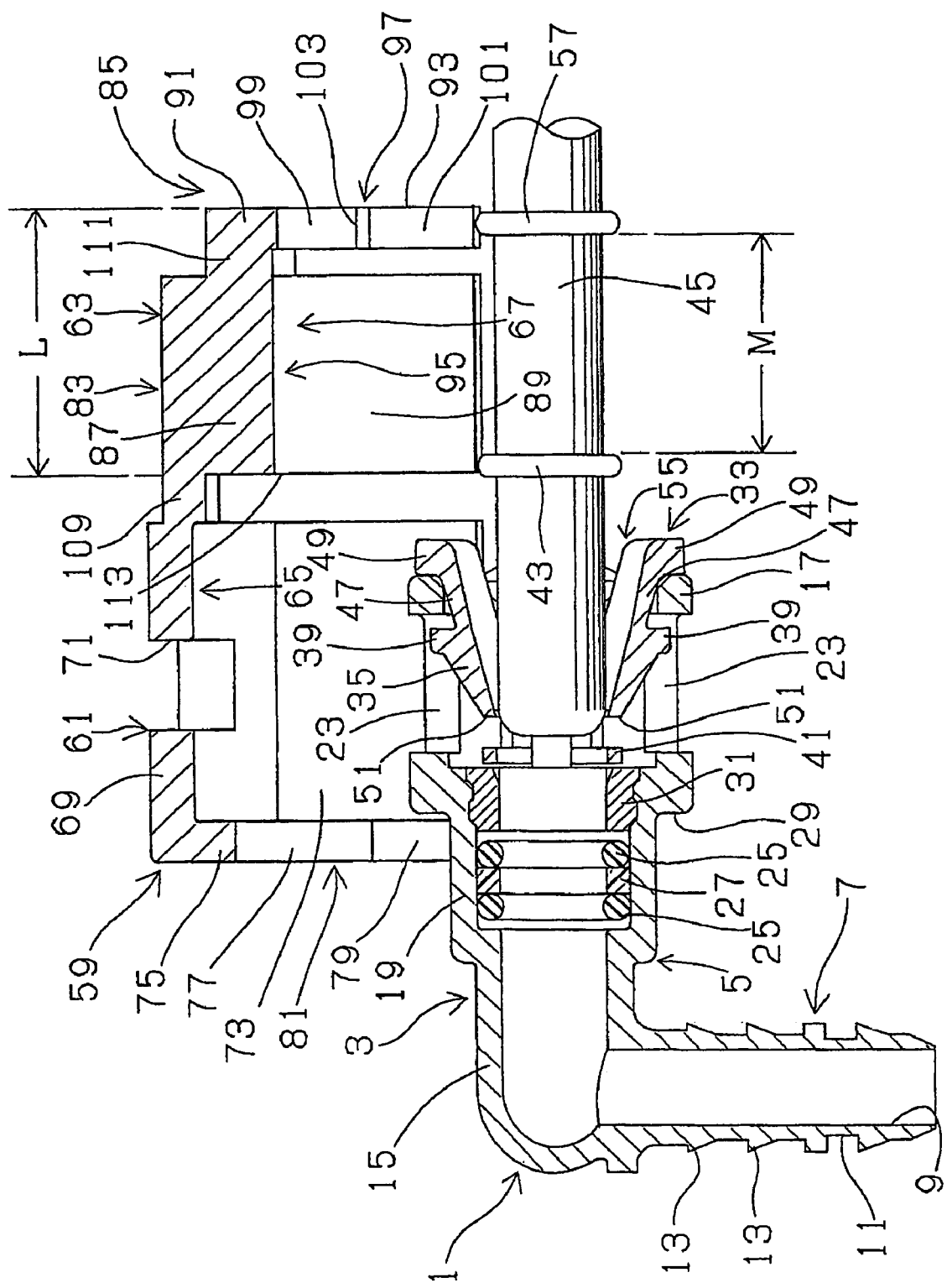
FIG. 12 is an explanatory view showing the case that the connector clip for verifying complete connection between a connector and a pipe according to the present invention is tried to be mounted to the connector and the pipe although the pipe is incompletely connected to the connector in different manner.

And, as understood from FIG. 12, if the pipe 45 is not sufficiently inserted in the connector 1 or the retainer 33, the annular verification projection 57 of the pipe 45 is located far apart from an opposite axial end of the connector housing 3 toward an opposite axial direction, and the annular verification projection 57 is to be located on an opposite axial side of (from or beyond) the connection verifying portion 63 (snap-fit portion 85), the connector clip 59 cannot be mounted to the connector 1 and the pipe 45. The reason is that, as an axial length (L in FIG. 12) of the connection verifying portion 63 of the connector clip 59 is designed longer than an axial length (M in FIG. 12) between the annular engagement projection 43 and the annular verification projection 57, when the connector clip 59 is tried to be mounted so as to allow the tubular holding portion 17 to be received in the connector receiving inner portion 65, the annular engagement projection 43 of the pipe 45 is located on a side of the verifying body 83, and thereby interference or abutment is caused between the annular engagement projection 43 and the verifying body 83 (in FIG. 12, the annular verification projection 57 is located in a position of the snap-fit portion 85, and abuts the snap-fit portion 85, and the annular engagement projection 43 abuts the verifying body 83). Consequently, the connector clip 59 cannot be mounted to the connector 1 and the pipe 45 so that the tubular holding portion 17 is received in the connector receiving inner portion 65 of the clip body 61.

Figure 13:
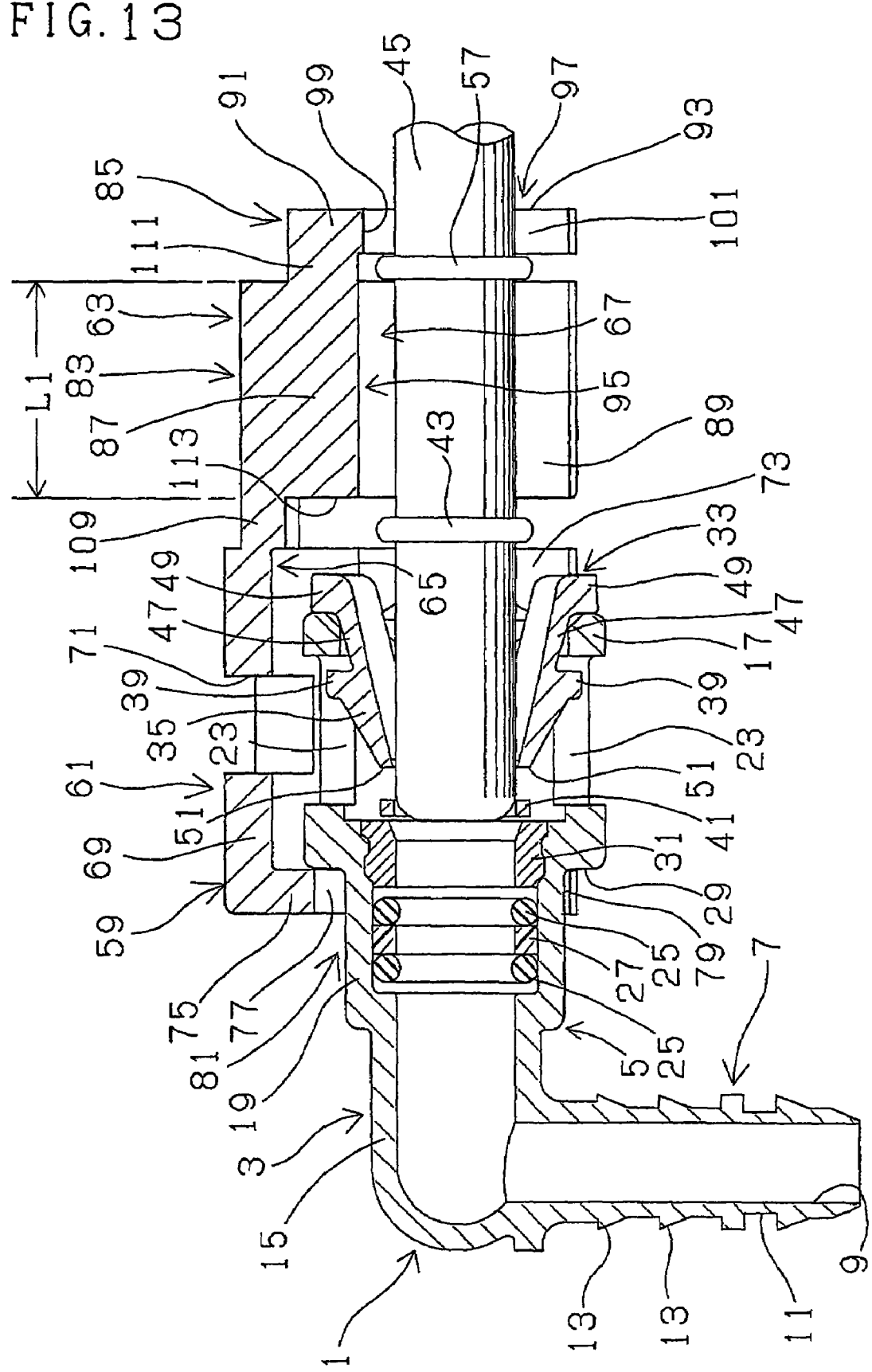
FIG. 13 is a sectional view showing the case that the connector clip for verifying complete connection between a connector and a pipe according to the present invention is successfully mounted to the connector and the pipe although the pipe is incompletely connected to the connector.

Meanwhile, if the pipe 45 is not sufficiently inserted in the connector 1 or the retainer 33, and the annular verification projection 57 of the pipe 45 is located relatively far apart from an opposite axial end of the connector housing 3 toward an opposite axial direction, as an axial length of the verifying body 83 of the connector clip 59 is designed shorter than an axial length between the annular engagement projection 43 and the annular verification projection 57 of the pipe 45, the connector clip 59 possibly happens to be mounted to the connector 1 and the pipe 45 as shown in FIG. 13. Here, the tubular holding portion 17 is received in the connector receiving inner portion 65 of the clip body 61, the annular engagement projection 43 of the pipe 45 seats between the clip body 61 and the verifying body 83 and the annular verification projection 57 of the pipe 45 seats between the verifying body 83 and the snap-fit portion 85 (However, here the annular verification projection 57 abuts a widthwise end of the joint piece 111, and the connector clip 59 is not mounted completely to the connector 1 and the pipe 45). However, even if such case happens, as an axial length (L1 in FIG. 13) of the verifying body 83 is designed longer than an axial distance (N in FIG. 10) between an inserting end of the pipe 45 and an opposite axial end of the O-ring 25 on an opposite axial side during complete connection, the annular verification projection 57 is located much toward an opposite axial direction by a length longer than an axial distance between the inserting end of the pipe 45 completely connected to the connector 1 and an opposite axial end of the O-ring 25 on an opposite axial side, compared to the case that the pipe 45 is correctly connected to the connector 1. That is, the inserting end of the pipe 45 is located rearwardly or retracted away from the O-ring 25 on an opposite axial side toward an opposite axial direction, and thereby no seal is provided between the connector housing 3 and the pipe 45. In this state, if an inspection fluid is flowed in the pipe 45, the inspection fluid leaks out between the pipe 45 and the connector 1, and thereby it is verified that the pipe 45 is insufficiently or incompletely connected to the connector 1. Even if the connector clip 59 is mounted to the connector 1 and the pipe 45 with a U-shaped opening side upward, as an inspection fluid is discharged through the drain opening 71, it can be easily verified that the pipe 45 is incompletely connected to the connector 1.

We claim:

1. A connector clip for verifying complete connection between a connector and a pipe to be put thereon and mounted thereto; the connector having a tube connection portion on one axial side thereof and being provided with sealing member in an inner peripheral surface thereof; the pipe being provided with an annular engagement projection and an annular verification projection on an outer peripheral surface thereof, and being relatively inserted into an opening on an axial end of the connector so as to allow an inserting end thereof to be located beyond the sealing member and the annular engagement projection to be snap-engaged with the connector; and the annular verification projection being formed so as to be located in or near an opposite axial end of the connector, or on an opposite axial side of an opposite axial end of the connector; comprising:

a clip body including a connector receiving recess of U-shape in cross-section and formed with a radially inwardly directed extending portion on one axial end thereof, the connector receiving recess having an opening and being formed to receive a large diameter portion on an opposite axial side of the connector therein, a connection verifying portion provided on an opposite axial end of the clip body and separated therefrom, and including a pipe receiving recess of U-shape in cross-section with width equal to or generally equal to an outer diameter of a body of the pipe, the pipe receiving recess having an opening and being formed to receive an opposite axial end of the pipe therein with respect to the annular verification projection, a circumferentially extending reinforcement rib formed integrally on a radially outer peripheral surface of the connection verifying portion to increase widening resistance of the pipe receiving recess, the radially inwardly directed extending portion and the connection verifying portion being arranged so as to hold a portion from one axial end of the large diameter portion to the annular verification projection of the pipe from axially opposite ends thereof, and the clip body and the connection verifying portion being integrally connected with one another via a connection part at an opposite position of the openings of the connector receiving recess and pipe receiving recess.

2. The connector clip for verifying complete connection between a connector and a pipe as set forth in claim 1 wherein the connection verifying portion includes a verifying body formed with the reinforcement rib and a snap-fit portion formed on an opposite axial end of the verifying body to be snap-fitted with the pipe, and the verifying body and the snap-fit portion are integrally connected via a joint part at an opposite position of the openings of the connector receiving recess and pipe receiving recess.

3. The connector clip for verifying complete connection between a connector and a pipe as set forth in claim 2 wherein the verifying body is formed of an axial length so as to allow the inserting end of the pipe to retract to an axial position generally identical to an opposite axial end of the sealing member or on an opposite axial side of the opposite axial end thereof when the annular verification projection is located between the verifying body and the snap-fit portion.

4. The connector clip for verifying complete connection between a connector and a pipe as set forth in claim 1 wherein the clip body includes a first arcuate wall portion and a pair of first side-wall portions which are connected integrally to the first arcuate wall portion on widthwise opposite ends thereof, the connection verifying portion includes a second arcuate wall portion and a pair of second side-wall portions which are connected integrally to the second arcuate wall portion at widthwise opposite ends thereof, the connection part is formed so as to bridge between the first arcuate wall portion of the clip body and the second arcuate wall portion of the connection verifying portion, and the first side-wall portions and the second side-wall portions are separated from each other.

5. The connector clip for verifying complete connection between a connector and a pipe as set forth in claim 4 wherein the connection part is connected to the second arcuate wall portion of the connection verifying portion via the reinforcement rib which is formed on one axial end portion of the connection verifying portion.

6. The connector clip for verifying complete connection between a connector and a pipe as set forth in claim 4 wherein the second arcuate wall portion is arranged concentric with the first arcuate wall portion.

7. The connector clip for verifying complete connection between a connector and a pipe as set forth in claim 4 wherein the reinforcement rib is formed along an entire circumference of an outer surface of the connection verifying portion so as to extend from an opening end of one of the second side-wall portions, via the second arcuate wall portion to an opening end of the other of the second side-wall portions.

8. The connector clip for verifying complete connection between a connector and a pipe as set forth in claim 7 wherein a plurality of the reinforcement ribs are arranged in axially spaced relation to each other.

9. The connector clip for verifying complete connection between a connector and a pipe as set forth in claim 8 wherein the reinforcement ribs adjacent each other are integrally joined by a joint portion formed integrally on an outer surface of the connection verifying portion at an opposite position of the opening.

10. The connector clip for verifying complete connection between a connector and a pipe as set forth in claim 4 wherein the connection verifying portion includes the verifying body having the second arcuate wall portion and the pair of the second side-wall portions which are connected integrally to the second arcuate wall portion at widthwise opposite ends thereof and a snap-fit portion formed on an opposite axial side of the verifying body to be snap-fitted with the pipe, the snap-fit portion includes an arcuate portion and a pair of side portions which are integrally connected to the arcuate portion at widthwise opposite ends thereof, and a joint part is formed so as to bridge between the second arcuate wall portion of the verifying body and the arcuate portion of the snap-fit portion, and the second side-wall portions and the side portions are separated from each other.

11. The connector clip for verifying complete connection between a connector and a pipe as set forth in claim 10 wherein the arcuate portion is arranged concentric with the second arcuate wall portion.

* * * * *